United States Patent [19]

Narita et al.

[11] Patent Number: 4,675,827

[45] Date of Patent: Jun. 23, 1987

[54] REVOLUTION CONTROLLER FOR A SINGLE POWER PLANT IN CARGO-HANDLING VEHICLES

[75] Inventors: Toshihide Narita, Obu; Masatoshi Yamada, Nagoya; Eiichi Yasuda, Seto, all of Japan

[73] Assignees: Kabushiki Kaisha Toyoda Jidoshokki Seisakusho, Kariya; Kabushiki Kaisha Toyota Chuo Kenkyusho, Aichi, both of Japan

[21] Appl. No.: 708,221

[22] Filed: Mar. 5, 1985

[30] Foreign Application Priority Data

Mar. 7, 1984 [JP] Japan ................... 59-44279

[51] Int. Cl.$^4$ ............ G06F 15/50; B66F 9/06
[52] U.S. Cl. ............ 364/478; 187/9 R; 414/636; 414/641; 364/424
[58] Field of Search ........ 364/424, 559, 478; 414/632-638, 640, 641, 272-275; 187/9 R, 9 E, 29 R, 29 A, 29 B; 180/315

[56] References Cited

U.S. PATENT DOCUMENTS

| | | | |
|---|---|---|---|
| 3,319,816 | 5/1967 | Christenson | 187/9 E X |
| 3,595,343 | 7/1971 | Williamson | 187/9 R |
| 3,628,678 | 12/1971 | Redelman et al. | 187/9 R X |
| 4,216,847 | 8/1980 | Jalbert et al. | 187/9 R |
| 4,411,582 | 10/1983 | Nakada | 414/636 |
| 4,491,918 | 1/1985 | Yuki et al. | 364/424 |
| 4,517,645 | 5/1985 | Yuki et al. | 364/424 |

FOREIGN PATENT DOCUMENTS

58-72762 4/1983 Japan .
58-96143 6/1983 Japan .
58-145525 8/1983 Japan .

Primary Examiner—Joseph Ruggiero
Attorney, Agent, or Firm—Brooks Haidt Haffner & Delahunty

[57] ABSTRACT

This invention relates to a cargo-handling vehicle equipped with a cargo-handling apparatus and having a single power plant adapted to commonly drive a hydraulic pump for driving and a hydraulic pump for cargo-handling. A driving command signal in the form of an analog or digital electric signal output from a driving operation device in response to the operated amount thereof is output to first conversion means. The first conversion means converts the driving command signal or the operated amount of the driving operation device to power plant revolution data for driving which is determined by the preset function, and then outputs the data to selection means. A cargo-handling command signal in the form of an analog or digital electric signal output from a cargo-handling operation device in response to the operated amount thereof is output to second conversion means. The second conversion means converts the cargo-handling command signal or the operated amount of the cargo-handling operation device to power plant revolution data for cargo-handling which is determined by the preset function, and then outputs the data to the selection means. The selection means selects at least one of the data and then outputs the selected data to control means for regulating the speed of the power plant. The control means regulates the power plant speed in accordance with the input data.

10 Claims, 20 Drawing Figures

REVOLUTION CONTROLLER FOR A SINGLE POWER PLANT IN CARGO-HANDLING VEHICLES

BACKGROUND OF THE INVENTION

1. Field of the Invention

The present invention relates to a revolution controller for a power plant in a cargo-handling vehicle, and more particularly to a revolution controller for controlling a single power plant which is adapted to commonly drive the hydraulic pumps for both driving the vehicle and operating the cargo-handling apparatus.

2. Description of the Prior Art

Heretofore, there have been proposed cargo-handling vehicles equipped with cargo-handling apparatus, such as a forklift truck or shovel loader, etc., in which an engine as a single power plant is used to commonly drive the hydraulic pumps for driving and cargo-handling. A cargo-handling vehicle of this type is so arranged that a pedal is mechanically coupled to a throttle through a wire, link or the like and, when driving the vehicle and when handling cargos, the pedal is stepped on to control the opening position of the throttle, i.e., the speed of the engine, in response to the depressed amount of the pedal.

Accordingly, in driving and cargo-handling, the pedal must be operatively trod in either case, resulting in very troublesome operation. In particular, when operating a cargo-loading apparatus while driving, highly skilled techniques are required.

To solve the above problem, therefore, it can be seen that a cargo-handling device (or cargo-handling operation lever) may be mechanically coupled to the throttle through a wire, link or the like. But such will increase the labor required for operating the cargo-handling device, and lead to many problems in the mechanism and its design, such as the mounting space and arrangement for the link, etc.

In addition, cargo-loading vehicles such as a forklift truck have optimum characteristics at different opening positions of the throttle (or speed of the engine) relative to the depressed amount of the pedal during driving, which are respectively different depending upon various driving conditions such as the presence or absence of cargos, weight of the same, driving on flat or sloped roads, etc.

Figure 1A:
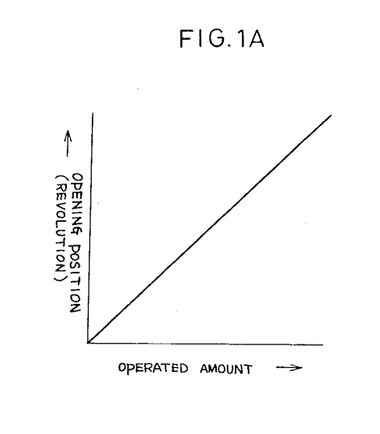
FIGS. 1A–1D are graphs showing the revolution or speed of a power plant relative to the operated amount of the pedal as a driving operation device.
Figure 1B:
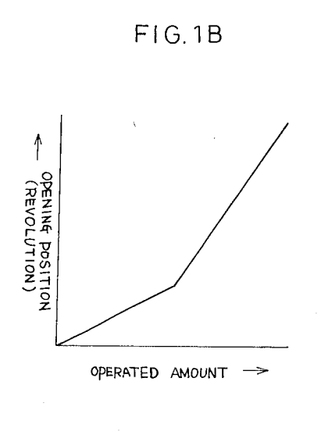
Figure 1C:
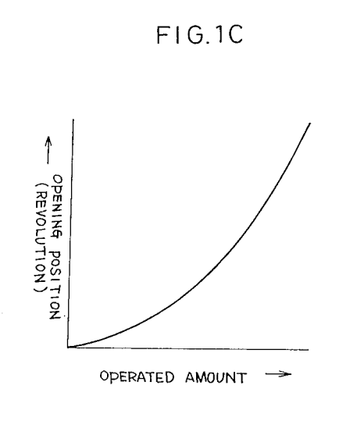
Figure 1D:
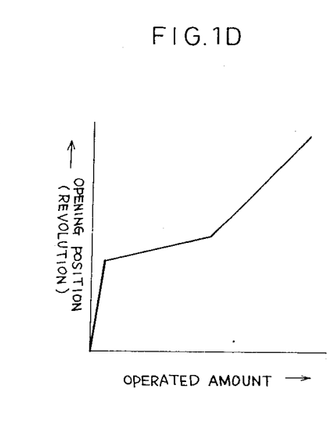

More specifically, the opening position of the throttle may be varied relative to the depressed amount of the pedal in accordance with, for example, the characteristic of the opening position of the throttle as shown in FIG. 1A when driving on flat roads without cargos, and the characteristic of the opening position of the throttle as shown in FIG. 1B or FIG. 1C when driving on flat roads with cargos, or that as shown in FIG. 1D when taking into account the response of a transmission.

In this connection, because the pedal and the throttle are mechanically coupled to each other as previously mentioned, the characteristics of the opening position of the throttle are uniquely determined relative to the depressed amount of the pedal. As a result, the vehicle cannot be driven while updating the characteristics of the opening position of the throttle to the optimums from time to time depending upon current driving conditions.

Figure 2A:
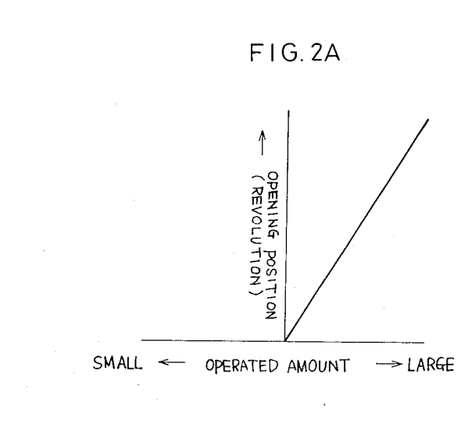
FIGS. 2A–2C are graphs showing the revolution or speed of the power plant relative to the operated amount of the lift lever as a cargo-handling operation device.
Figure 2B:
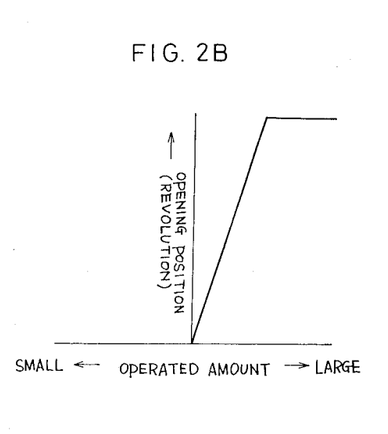
Figure 2C:
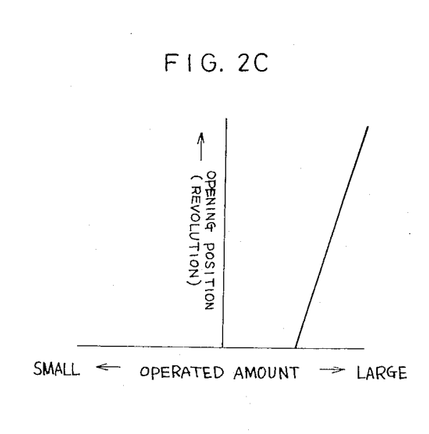

Likewise, the pedal is also operated when vertically moving a fork and when longitudinally tilting a mast and, depending upon cargo-handling conditions, there are different optimum characteristics of the opening position of the throttle (or the speed of the engine) relative to the depressed amount of the pedal, for example, as shown in FIGS. 2A-2C when vertically moving the fork, and as shown in FIGS. 3A-3D when longitudinally tilting the mast.

Also in these cases, however, because the pedal and the throttle are mechanically coupled to each other, it is impossible to carry out cargo-handling while updating the characteristics of the opening position of the throttle to optimums from time to time depending upon the current cargo-handling conditions.

Even with the above proposed arrangement including a cargo-handling operating lever mechanically coupled to the throttle, and because the characteristics of the open position of the throttle are uniquely determined relative to the operated amount of the cargo-handling operating lever, it is impossible to carry out cargo-handling while updating the characteristics of the opening position of the throttle relative to the operated amount of the cargo-handling operating lever to different optimums depending upon cargo-handling conditions, as experienced when using the pedal.

Such gives rise to another problem when driving and cargo-handling are to be carried out simultaneously. Stated differently, because of the complicated cross relationships of the foregoing various conditions, conventional mechanical coupling systems do not permit selection of an optimum characteristic of a given engine speed for commonly driving the hydraulic pumps for both driving the vehicle and cargo-handling in one position of the pedal or cargo-handling operating lever.

SUMMARY OF THE INVENTION

It is an object of the present invention to eliminate mechanical coupling between the driving operating device and the cargo-handling operating device and speed control means such as a throttle, etc. for regulating the speed of a power plant such as an engine, etc., to reduce the labor required for operating the driving device and the cargo-handling device, and to solve the mechanical and design problems attendant on the prior art, such as a mounting space, arrangement, etc. for the link or the like.

Another object of the present invention is to provide a speed controller for a power plant in cargo-handling vehicles which, by eliminating the mechanical coupling between the driving operation device and the cargo-handling device and speed control means for regulating the speed of a power plant, makes it possible to selectively control the speed of the power plant in accordance with optimum speed characteristics from time to time depending upon the current driving and cargo-loading conditions, and to increase the degree of freedom allowing flexible adaptation corresponding to various purposes.

To achieve the above objects, the present invention provides a revolution controller for a single power plant in cargo-handling vehicles equipped with a cargo-handling apparatus and having the power plant adapted to commonly drive hydraulic pumps for both driving and cargo-handling. The revolution controller comprises a first conversion means for converting an operated amount or driving command signal for driving from a driving operation device to revolution data for driving under a predetermined driving condition; second conversion means for converting an operated amount or cargo-handling commmand signal for cargo-handling from a cargo-handling operation device to revolution data for cargo-handling under a predetermined cargo-handling condition; selection means for selecting at least either one of the revolution data for driving and cargo-handling as the revolution data to be applied to the power plant; and control means for controlling the speed of the power plant based on the power plant revolution data.

As described in the above, according to the present invention, there can be obtained many merits in that, since the power plant is controlled in its speed by either the driving operation device or the cargo-handling operation device being operated, troublesome drive operation is eliminated when handling cargos; in that the labor required for operating the cargo-handling operation device is reduced as compared with the prior art mechanical coupling system by adding the present controller; and in that since the driving operation device is mechanically separated from the power plant, operation feeling can be set at will.

Other objects of the present invention will be apparent by understanding the following embodiments and will be disclosed in the attached claims. Many other advantages not referred to in this description may occur to those skilled in the art when practising the present invention.

DETAILED DESCRIPTION OF THE PREFERRED EMBODIMENTS

The essentials of the present invention are as follows: An driving command signal in the form of an analog or digital electric signal output from a driving operation device corresponding to the operated amount thereof is applied to a first conversion means. The first conversion means is a function generator which converts the driving command signal, i.e., the operated amount of the driving operation device, to power plant revolution data for driving, which is determined by a preset function, and then applied to selection means as will be described.

A cargo-handling command signal in the form of an analog or digital electric signal output from a cargo-handling device corresponding to the operated amount thereof is applied to a second conversion means. The second conversion means is a second function generator which converts the cargo-handling command signal, i.e., the operated amount of the cargo-handling operation device, to power plant revolution data for cargo-handling, which is determined by a preset function, and then applied to the same selection means.

Meanwhile, the selection means selects at least one of the data and then applies the selected data to control a means for regulating the speed of the power plant. The control means regulates the power plant to the speed in accordance with the input data.

In this way, by replacing the operated amounts of the driving operation device and the cargo-handling operation device with the operated amount signals in the form of an analog or digital electric signals to control the speed of the power plant based on the operated amount signals, optimum speed control depending upon the current conditions can be achieved unlike the prior art mechanical coupling system. In other words, it becomes possible to obtain independent revolution data for driving and cargo-handling with respect to the driving operation device and the cargo-handling operation device, and to select that one of the revolution data which is optimum, or any desired functions, respectively, thereby controlling the speed of the power plant at optimum.

From the standpoint of electric circuit technology, the first and second conversion means can be designed to previously set and selectively output, on demand, the various optimum characteristics of the revolution of the power plant (or the opening position of throttle) relative to the operated amount as shown in FIGS. 1–3 depending upon various driving conditions and various cargo-handling conditions, respectively. This makes it possible to control the revolution of the power plant in accordance with that which is optimum for driving and that which is optimum for cargo-handling from time to time depending upon the driving and cargo-handling conditions, and to easily provide flexible adaptation corresponding to various purposes because of the increased degree of freedom.

It also becomes possible to solve the mechanical and design problems, such as the mounting space and arrangement for a link, etc., which have been encountered in the prior art mechanical coupling system.

Furthermore, the present invention may have the following forms when practically embodied.

According to a first form of the present invention, the selection means is designed to compare the revolution data for driving with the revolution data for cargo-handling in their magnitudes and then select the larger one as the revolution data applied to the power plant. With this, speed control of the power plant can always be maintained in accordance with the larger requirement, and the selection means can be very simplified in its circuit arrangement, thus allowing the circuit to be designed easily.

Figure 4:
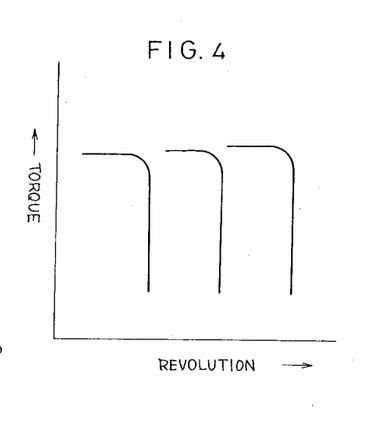
FIG. 4 is a graph showing a torque characteristic of a diesel engine of an all speed governor type.

Such a first form is more effectively utilized in cargo-handling vehicles loaded with a diesel engine of an all speed governor type, which has torque characteristics as shown in FIG. 4, for example, where at the constant opening position of the throttle changes in speed are small if the load is changed with its variations within the maximum load. More specifically, while there is no problem in the case of either driving or cargo-handling alone, the load exerted on the power plant is increased due to cargo-handling in case of handling cargos while driving. For this reason, i.e., from the fact that cargo-handling requires speed and driving requires torque, the revolution data in accordance with the operated amount of the cargo-handling device is generally set to have a much larger value than the revolution data in accordance with the operated amount of the driving operation device.

As a result, when handling cargos while driving, a diesel engine of the all speed governor type is subjected to revolution control based on the revolution data of the larger value, i.e., the revolution data for cargo-handling in this case, to thereby sufficiently fulfill the intended purposes.

Figure 5:
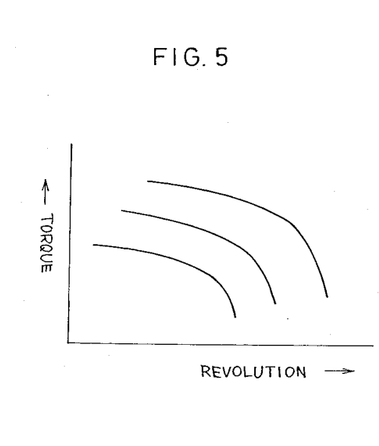
FIG. 5 is a graph showing a torque characteristic of a gasoline engine.

Moreover, the first form of the present invention may be applied to cargo-handling vehicles equipped with a gasoline engine which has torque characteristics as shown in FIG. 5, for example. In this case, when handling cargos while driving, the speed is also varied with variations in the torque, but no trouble in practical use results for the reasons that variations in speed are smaller than variations in torque upon an increase in speed due to cargo-handling, and that the vehicle is being driven at a low speed.

According to a second form of the present invention, the selection means is designed to select both the revolution data for driving and the revolution data for cargo-handling and then output the sum of them as the revolution data which is applied to the power plant. In other words, the power plant is controlled in its speed based on the sum of the power plant revolution characteristics for driving and the power plant revolution characteristics for cargo-handling.

As a result, such a second form makes it possible to achieve speed control of the power plant while sufficiently meeting the requirements given from the driving operation device and the cargo-handling device, when handling cargos while driving. There can be thus obtained the effect of permitting more optimum revolution control as compared with the foregoing first form in cargo-handling vehicles loaded with a gasoline engine exhibiting the torque characteristics as shown in FIG. 5, along with an all speed governor type diesel engine as mentioned above.

Next, the preferred embodiments materializing the present invention in more practical forms will be described hereinafter with reference to the drawings.

Figure 6:
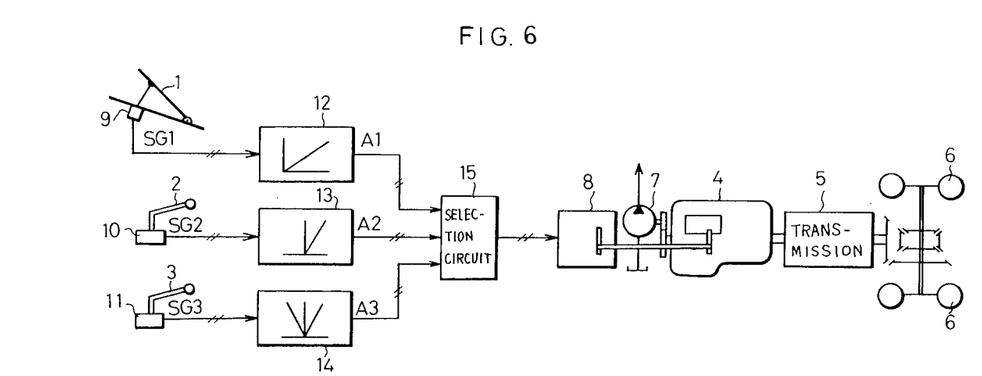
FIG. 6 is an electric circuit block diagram for explaining a first embodiment of the present invention.

According to a first embodiment, the present invention is practically applied to a forklift truck. FIG. 6 shows an electric circuit block diagram of a revolution controller for controlling revolutions of an engine 4, which is loaded on the forklift truck, based on operations of a pedal 1, a lift lever 2 and a tilt lever 3 all equipped on the forklift truck. In this embodiment, an all speed governor type diesel engine is adopted as the engine 4 which drives driving wheels 6 through a transmission 5. The engine 4 also drives a hydraulic pump 7 for cargo-handling, which is adapted to supply pressure oil to a cargo-handling apparatus, i.e., a lift cylinder for vertically moving a fork and a tilt cylinder for longitudinally tilting a mast. A throttle for regulating the revolution of the engine 4 is controlled in the opening position thereof by a throttle actuator 8 which serves as control means.

On the other hand, the pedal 1 is provided with a pedal angle sensor 9 comprising any one of a potentiometer, inductance type displacement meter or variable capacitance type displacement meter, which is adapted to detect a pedal angle of the pedal 1. This sensor 9 outputs an operated amount, or driving command signal SG1 of a value in proportion to the pedal angle or depressed amount of the pedal 1. The lift lever 2 is used when driving the lift cylinder, and is provided with a lift lever sensor 10 comprising a potentiometer adapted to detect an operated amount of the lever 2, thereby outputting a cargo-handling command signal for lifting SG2 as an operated amount signal for cargo-handling having a value in proportion to the amount detected by the sensor 10.

Furthermore, the tilt lever 3 is used when driving the tilt cylinder, and is provided with a tilt lever operated amount sensor 11 comprising a potentiometer adapted to detect an operated amount of the lever 3, thereby outputting a cargo-handling command signal for tilting SG3 as an operated amount signal for cargo-handling of a value in proportion to the amount detected by the sensor 11.

A driving function generator 12 serving as a first conversion means to input the driving command signal SG1 is a circuit adapted to convert the input signal SG1 to engine revolution data A1 for driving, whereby the signal SG1 is converted to the revolution data A1 based on a preset function corresponding to driving conditions. In this embodiment, the function corresponding to driving conditions is preset to have the characteristic of the opening position of the throttle (namely, engine revolution data A1 for driving) relative to the operated amount (nammely, signal SG1) as shown in FIG. 1C, so that the driving function generator 12 outputs the revolution data A1 with respect to the operated amount signal SG1.

A lifting function generator 13 serving as a second conversion means to input the cargo-handling command signal for lifting SG2 is a circuit adapted to convert the input signal SG2 to engine revolution data A2 for driving the lift cylinder, whereby the signal SG2 is converted to the revolution data A2 based on a preset function corresponding to cargo-handling conditions. In this embodiment, the function corresponding to cargo-handling conditions is preset to have the characteristic of the opening position of the throttle (namely, engine revolution data A2 for driving the lift cylinder) relative to the operated amount (namely, the signal for lifting SG2) as shown in FIG. 2A, so that the lifting function generator 13 outputs the revolution data A2 with respect to the cargo-handling command signal for lifting SG2.

Figure 3A:
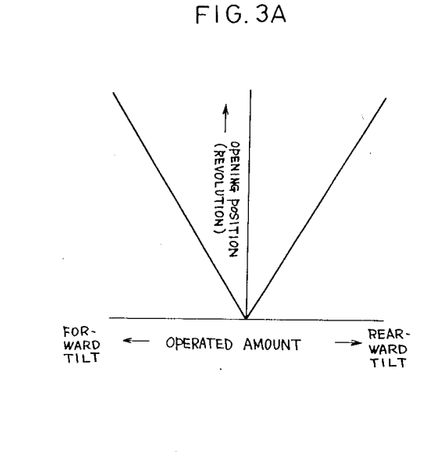
FIGS. 3A–3D are graphs showing the revolution or speed of the power plant relative to the operated amount of the tilt lever as a cargo-handling device.
Figure 3B:
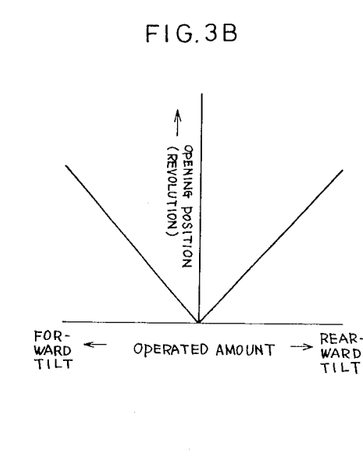
Figure 3C:
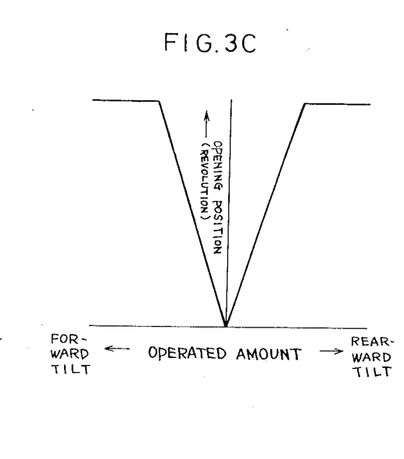
Figure 3D:
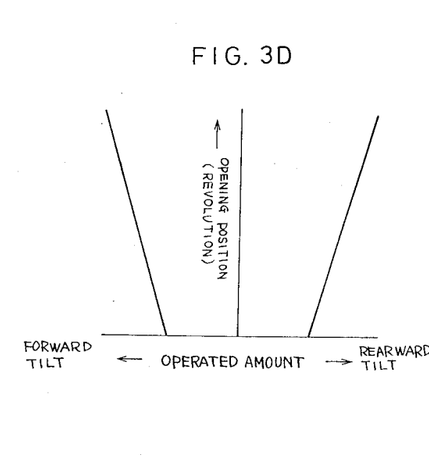

A tilting function generator 14 serving also as a second conversion means to input the cargo-handling command signal for tilting SG3 is a circuit adapted to convert the input operated amount signal SG3 to engine revolution data A3 for driving the tilt cylinder, whereby the signal SG3 is converted to the revolution data A3 based on a preset function corresponding to cargo-handling conditions. In this embodiment, the function corresponding to cargo-handling conditions is preset to have the characteristic of the opening position of the throttle (namely, engine revolution data A3 for driving the tilt cylinder) relative to the operated amount (namely, the signal for tilting SG3) as shown in FIG. 3B, so that the tilting function generator 14 outputs the revolution data A3 with respect to the operated amount signal for tilting SG3.

It is to be noted that optimum functions of the respective function generators 12–14 may be selected by determining the driving and cargo-handling conditions from sensors for detecting the presence or absence and weight of cargos, a sensor for detecting the vehicle speed, a pressure sensor in hydraulic circuitry for detecting the load during driving, etc., all these sensors not shown, and then selecting the respective optimum functions fit for the current conditions.

The revolution data A1–A3 are each output to a selection circuit 15 in the next stage. The selection circuit 15 is designed to select any one of those revolution data A1–A3 to be output to the throttle actuator 8. In this embodiment, the selection circuit 15 is so arranged that if only one of the revolution data A1–A3 is output, it selects that one and if the revolution data A1–A3 are output at the same time, it selects those data sequentially in accordance with the priority preset.

When the revolution data selected by the selection circuit 15 is directly output to the throttle actuator 8, the actuator 8 now regulates the throttle based on that data to thereby control the speed of the engine 4 based on that data.

The operative effect of the first embodiment thus arranged will be described below.

Now, assuming that the vehicle is being driven by operating the pedal 1 only, the driving command signal SG1 is output from the pedal angle sensor 9 to the driving function generator 12. The driving function generator 12 converts the signal SG1 to the revolution data A1 for driving in accordance with the function of FIG. 1C based on the driving and cargo-handling conditions, and outputs the data A1 to the selection circuit 15. The selection circuit 15 outputs the revolution data A1 to the throttle actuator 8 based on the fact that only the data A1 is input thereto at that time, thereby controlling the speed of the engine 4 through the throttle actuator 8.

Next, when the lift lever 2 is operated while driving, the revolution data A1 for driving is output to the selection circuit 15 similarly to the above case. On the other hand, the cargo-handling command signal for lifting SG2 is output from the lift lever sensor 10 to the lifting function generator 13. The lifting function generator 13 converts the signal for lifting SG2 to the revolution data A2 for driving the lift cylinder in accordance with the function of FIG. 2A based on the current cargo-handling conditions, and outputs the revolution data A2 to the selection circuit 15.

The selection circuit 15 inputs both the revolution data A1 and A2 and then selects the revolution data A2 in accordance with the priority preset to be output to the throttle actuator 8, thereby controlling the speed of the engine 4 through the actuator 8.

Likewise, when operating the lift lever 2 or tilt lever 3 in the stopped state, or when operating the tilt lever 3 while driving, the corresponding optimum revolution data A1–A3 are output from the respective function generators 12–14, so that the engine 4 is controlled in its speed at the optimum conditions.

In the foregoing embodiment, since the function generators 12–14 are preset to provide the various optimum functions of the speed of the engine 4 (or the opening positions of the throttle) with respect to the operated amount signals SG1–SG3 as shown in FIGS. 1A–3D, respectively, depending upon various driving and cargo-handling conditions, the speed of the engine 4 can be controlled in accordance with the optimum speed characteristics for both driving and cargo-handling from time to time depending upon the driving and cargo-handling conditions.

In addition, it is possible to obtain independent revolution data A1–A3 for driving and cargo-handling with respect to operation of the pedal 1, the lift lever 2 and the tilt lever 3, whereby the speed of the engine 4 can be controlled based on any operation device in case of either driving or cargo-handling alone. Furthermore, when handling cargos while driving, the signal required for cargo-handling is obtained separately from the signal associated with the pedal, thus making it possible to select one of various signals which is required for a throttle signal applied to the engine 4 for carrying out control. More specifically, the throttle signal from the pedal is selected while driving, but if cargo-handling is then effected, it becomes possible to select the throttle signal from the cargo-handling operation lever in place of that from the pedal even with the pedal remaining unchanged, thereby controlling the engine throttle based on the replaced throttle signal.

Therefore, the mutual correlation between the respective operation devices which requires, for example, depression of the pedal to thereby regulate the speed of the engine 4 even when handling the cargos, can be eliminated and hence driving and cargo-handling can be effected independently such that driving requires the operation of the pedal only and cargo-handling requires the operation of the cargo-handling lever. This results in such an advantage that the operation for driving and cargo-handling is very simplified. Stated differently, in spite of a single power plant used for driving the hydraulic pumps for driving and cargo-handling, there can be achieved the same operability as obtained in cargo-handling vehicles having separate power plants for driving and cargo-handling independently.

Furthermore, this embodiment has, unlike the prior art mechanical coupling system, the additional advantage of solving the mechanical and design problems, such as the mounting space and arrangement for the link, etc.

Although in this embodiment the functions of the revolution data A1–A3 with respect to the operated amount signals SG1–SG3 in the number as seen from FIGS. 1A to 3D have been preset in the corresponding function generators 12–14, the number of functions may be increased or decreased when practised. Of course, it is also possible to set any desired function differently from the illustrated one for a particular purpose and to carry out control based on such a function.

Alternatively, a functional equation including therein various conditions may be used for calculation to obtain the speed.

Also, functions included in the function generators 12–14 may be variously preset for each model to provide the specific intended patterns, or may be manually selected by an operator through switches, etc.

Furthermore, the selection circuit 15 can be embodied, when the revolution data A1–A3 are input thereto at the same time, to select the largest one out of those revolution data as mentioned in connection with the first form, or to calculate the sum of those revolution data and then output the resulting sum as the power plant revolution data as mentioned in connection with the second form. In either case, there can be achieved an effect similar to the foregoing embodiment in various use modes.

More specifically, with the selection circuit being so designed to select the maximum value out of A1–A3 as a throttle signal similar to the first form, when handling cargos while driving or when operating to lift and tilt simultaneously, the smallest revolution required by the engine is always satisfied by selecting the larger revolution required thereto, so that all requirements for the intended operations may be surely met without insufficiency.

Further, the engine 4 is not limited to an all speed governor type diesel engine, and it may instead comprise a diesel engine of minimum/maximum type, gasoline engine, motor, etc., for example. In other words, any type of power plant can be employed so long as it may drive the vehicle and drive the hydraulic pump for cargo-handling by one unit.

Although in this embodiment the throttle actuator 8 was arranged to be separated from the engine 4, it is also possible to modify the arrangement such that the throttle actuator 8 is integral with the engine 4, as seen in an electronic control fuel injector by way of example.

In addition, the present invention may be applied to various types of cargo-handling vehicles such as a shovel loader, working vehicle for elevated spots, etc. other than a forklift truck.

Figure 7:
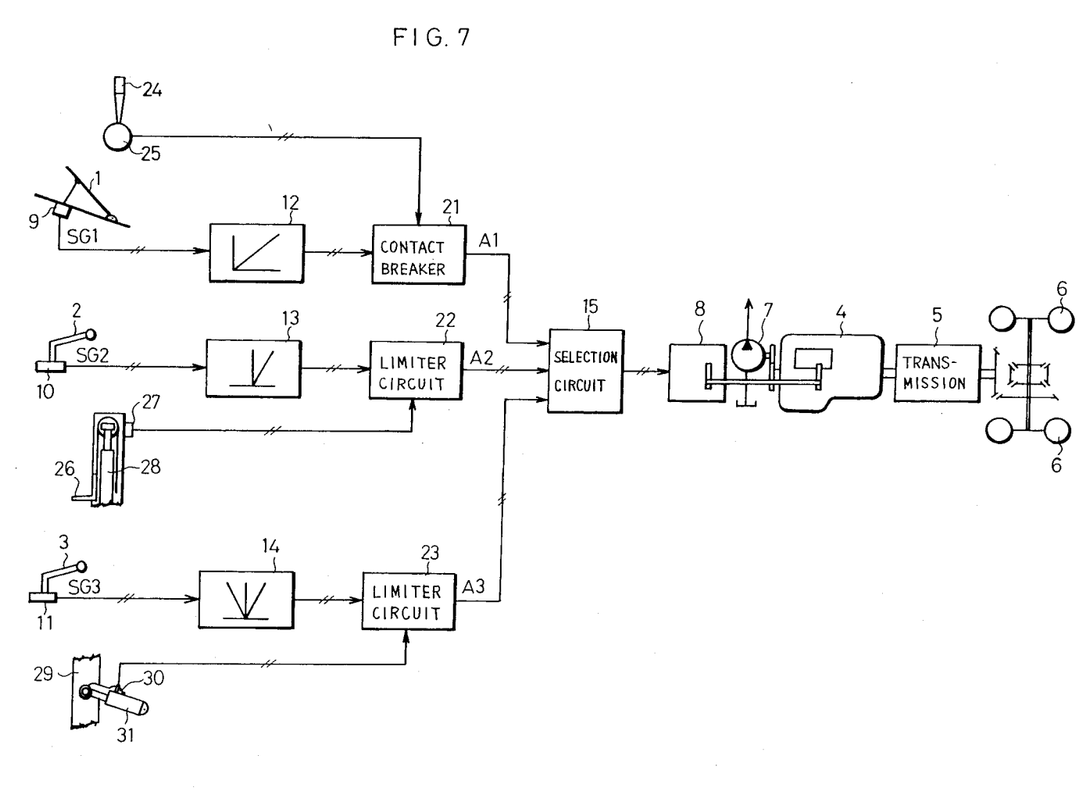
FIG. 7 is an electric circuit block diagram for explaining a second embodiment of the present invention.

In a second embodiment, the present invention is practically applied to a forklift truck similarly to the first embodiment. The former is different from the latter in that, as shown in FIG. 7, the revolution data A1 for driving is output to the selection circuit 15 through a contact breaker 21 and the revolution data A2, A3 for driving the lift and tilt cylinders are output to the selection circuit 15 through limiter circuits 22, 23, respectively.

More specifically, the contact breaker 21 inputs a detection signal from a sensor 25 which is mounted on an forward/backward lever 24 to detect a forward, backward or neutral state of the lever 24. The contact breaker 21 is so designed to interrupt the revolution data A1 when the forward/backward lever 24 is in a neutral state, and to output the revolution data A1 directly to the selection circuit 15 in other states.

In other words, when the forward/backward drive lever 24 is in a neutral state, the engine 4 will not be controlled in its speed in accordance with the revolution data A1, thereby preventing idling of the engine to reduce fuel consumption.

Incidentally, the contact breaker 21 may be selectively actuated by the operator's manual operation.

Meanwhile, the lifting limiter circuit 22 inputs a detection signal from an upper stroke end sensor 27 for detecting an upper limit position of the fork 26. The lifting limiter circuit 22 is designed so that, once the detection signal is input, it establishes an upper limit based on the preset setting value and holds such an upper limit even if the lift lever 2 is operated to increase the speed still more since then.

Accordingly, in such a state that the fork has moved upward to its upper limit position and it will not ascend to still higher positions, it becomes possible to prevent idling of the engine 4 and to reduce fuel consumption attendant on the operation of the lift lever 2.

On the other hand, the tilting limiter circuit 23 inputs a detection signal from a longitudinal stroke end sensor 30 for detecting a most forwardly tilted position and a most rearwardly tilted position of the mast 29. The tilting limiter circuit 23 is designed so that, once the detection signal is input, it establishes an upper limit based on the preset setting value and holds such an upper limit even if the tilt lever 3 is operated to increase the speed still more since then.

Accordingly, in such a state that the mast has tilted up to a most forwardly tilted position or most rearwardly tilted position and it will not tilt still more, it becomes possible to prevent idling of the engine 4 and to reduce fuel consumption attendant on operation of the tilt lever 3.

In a third embodiment, the present invention is embodied using a microcomputer.

Figure 8:
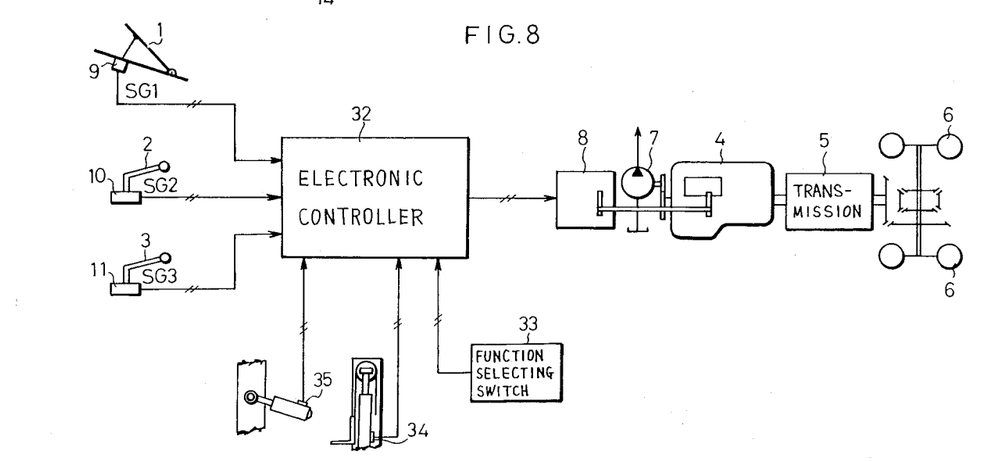
FIG. 8 is an electric circuit block diagram for explaining a third embodiment of the present invention.
Figures 9, 10:
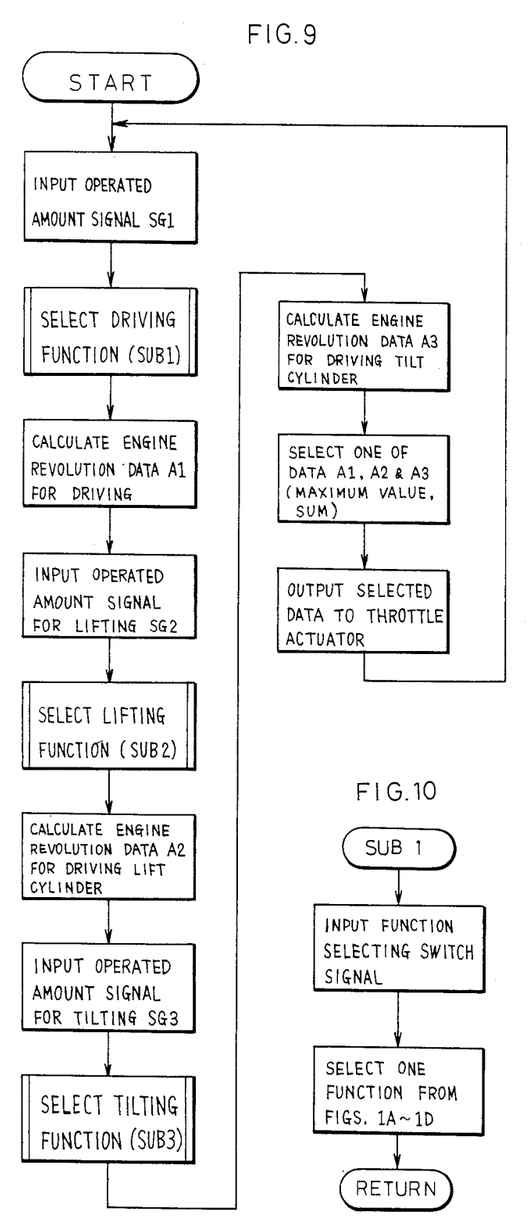
FIGS. 9–12 are flow charts showing the processing operation of an electronic controller used in the third embodiment.
Figure 11:
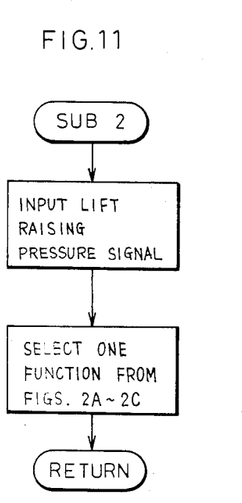
Figure 12:
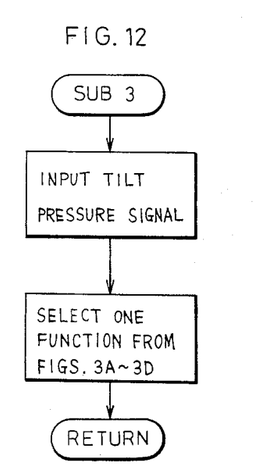

As shown in FIG. 8, the respective operated amount signals SG1-SG3, the selection signal from a function selecting switch 23, the pressure signal from a pressure gauge 34 for a hydraulic circuit on the lift cylinder raising side, the pressure signal from a pressure gauge 35 for a tilt cylinder hydraulic circuit, etc. are output to an electronic controller 32 which comprises a central processing unit (CPU), a read only memory (ROM) storing therein control programs, a random access memory (RAM) storing therein various data, etc. The electronic controller 32 executes the arithmetic processing operation in accordance with the flow chart as shown in FIG. 9 based on the operated amount signals SG1-SG3.

On this occasion, the revolution data A1-A3 are calculated using given functions which have been selected in accordance with the preset program data. Stated differently, the function for driving (or A1 with respect to SG1) is selected out of those as shown in FIGS. 1A-1D through the selection switch 33 actuated selectively by the operator. The function for lifting (or A2 with respect to SG2) is selected with the pressure signal from the lift cylinder raising side in the order of FIGS. 2C, 2A and 2B starting from the lower pressure level. The function for tilting (or A3 with respect to SG3) is selected with the pressure signal from the tilt cylinder in the order of FIGS. 3B or 3D, 3A and 3C starting from the lower pressure level. It is further arranged that selection of the respective revolution data A1-A3 is made by selecting the proper data based on the program, by selecting the maximum revolution data, or by arithmetically processing to take the sum of the respective data as the power plant revolution data.

According to the third embodiment thus arranged, the throttle signal with respect to the pedal can be optionally selected by the operator, thus making it possible to easily obtain the functions depending on work conditions such as the presence or absence and weight of cargos, slope, etc., or corresponding to a preference of the operator such as a preference for responsivity of the pedal. Since the functions for cargo-handling are varied depending on the load of cargos, it becomes possible to increase the speed of the engine only when power is required, to reduce the level of noises and improve fuel consumption, as well as to improve a cargo-handling speed and responsivity when raising up heavy cargos.

Furthermore, providing various function patterns necessarily leads to an increased number of parts in the case of using electric circuits, but can be achieved just by adding software in the case of using a microcomputer, thus resulting in the advantages that the controller is compacted and the specifications can be changed with ease. When employing the function as shown in FIG. 1D, the electric circuits are complicated, while the microcomputer can readily produce the function by modifying the software. In addition, when switching over three or more functions, the electric circuits are complicated, while the use of the microcomputer will not accompany the problem of complexity in the hardware.

As described in the above, according to the present invention, there can be obtained many merits in that, since the power plant is controlled in its speed with either the driving operation device or the cargo-handling operation device being operated, the need for a troublesome drive operation is eliminated when handling cargos; in that the labor required for operating the cargo-handling operation device is reduced as compared with the prior art mechanical coupling system by adding the present controller; and in that since the driving operation device is mechanically separated from the power plant, operation feeling can be set at will.

Furthermore, the need for arrangement of a link, wire or the like is eliminated and this increases the degree of freedom in designing the layouts of the driver's seat and the power plant, for example. In addition, the speed of the power plant relative to the operated amount can be easily adapted to meet the intended purposes with a substantial degree of freedom by utilizing the circuit for function generators and the control program. As a result, it becomes possible to incorporate controllers of the same mechanism in cargo-handling vehicles having different power plant or bodies, for example, and to allow those controllers to properly function just by modifying the circuit and program to some degree.

Moreover, the associated control using the present control system can be achieved with ease, thus resulting in very valuable technical effects.

It is apparent that other embodiments different from the foregoing ones can be selected in a wide range without departing from the spirit and scope of the present invention and, therefore, the present invention is limited only by the attached claims and not restricted to the particular embodiments thereof.

What is claimed is:

1. A revolution controller for a single power plant, in a cargo-handling vehicle equipped with a cargo-handling apparatus and having the power plant adapted to commonly drive a hydraulic pump for driving said vehicle and a hydraulic pump for cargo-handling, comprising:
   (a) a vehicle driving device having means for generating a driving command signal representing an operated amount thereof;
   (b) first conversion means for converting a driving command signal from said vehicle driving device to revolution data for driving;
   (c) a cargo-handling device having means for generating a cargo-handling command signal representing an operated amount thereof;
   (d) second conversion means for converting a cargo-handling signal from said cargo-handling device to revolution data for cargo-handling;
   (e) selection means for selecting at least either one of said revolution data for driving and cargo-handling as revolution data to be applied to said single power plant, said selecting means having means for generating an output signal representing said power plant revolution data; and
   (f) control means independent of both said vehicle driving device and said cargo-handling device but responsive to said selection means output signal for controlling the speed of said single power plant based on said power plant revolution data.

2. A revolution controller for a power plant according to claim 1, wherein said selection means comprises means for comparing said revolution data for driving with said revolution data for cargo-handling in their numerical values, and then selecting the larger data as said power plant revolution data.

3. A revolution controller for a power plant according to claim 1, wherein said selection means comprises means for selecting both said revolution data for driving and said revolution data for cargo-handling, and then outputting the sum of both said data as said power plant revolution data.

4. A revolution controller for a power plant according to claim 1, wherein said vehicle driving device comprises a pedal and a pedal angle sensor for detecting a pedal angle of said pedal to output said driving command signal from said driving device in response to the detected amount, and wherein said first conversion means comprises a function generator for inputting said driving command signal from said driving device.

5. A revolution controller for a power plant according to claim 1, wherein said cargo-handling device comprises a lift lever, a lift lever sensor for detecting an operated amount of said lift lever to output a cargo-handling command signal for lifting therefrom in response to the detected amount, a tilt lever, and a tilt lever sensor for detecting an operated amount of said tilt lever to output a cargo-handling command signal for tilting therefrom in response to the detected amount, and wherein said second conversion means comprises a lifting function generator for inputting said cargo-handling command signal for lifting and a tilting function generator for inputting said cargo-handling command signal for tilting.

6. A revolution controller for a power plant according to claim 1, wherein a contact breaker for interrupting the revolution data from said first conversion means when a forward backward lever is in a neutral state, is provided between said first conversion means and said selection means.

7. A revolution controller for a power plant according to claim 1, wherein a limiter circuit for restricting the upper limit of said revolution data from said second conversion means to a value whereby said cargo-handling device is operated only to its farthest positions is provided between said second conversion means and said selection means.

8. A revolution controller for a power plant according to claim 7, wherein said cargo-handling vehicle is a forklift truck, and wherein said limiter circuit is a lifting limiter circuit for inputting a detection signal from a stroke end sensor adapted to detect the most moved position of a fork, and a tilting limiter circuit for inputting a detection signal from a stroke end sensor adapted to detect the most inclined position of a mast.

9. A revolution controller for a power plant according to claim 1, wherein said first and second conversion means and said selection means are composed of a single electronic controller.

10. A revolution controller for a power plant according to claim 1, which further comprises function selecting means operating said first conversion means for preselecting a vehicle driving condition, and function selecting means operating said second conversion means for preselecting a cargo-handling condition of operation of said cargo-handling device.

* * * * *